United States Patent
Akiyama

(10) Patent No.: US 11,654,887 B2
(45) Date of Patent: May 23, 2023

(54) CONTROL METHOD FOR HYBRID VEHICLE AND CONTROL DEVICE FOR HYBRID VEHICLE

(71) Applicant: Nissan Motor Co., Ltd., Yokohama (JP)

(72) Inventor: Hidekatsu Akiyama, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/603,611

(22) PCT Filed: Apr. 16, 2019

(86) PCT No.: PCT/JP2019/016314
§ 371 (c)(1),
(2) Date: Oct. 14, 2021

(87) PCT Pub. No.: WO2020/213056
PCT Pub. Date: Oct. 22, 2020

(65) Prior Publication Data
US 2022/0212654 A1    Jul. 7, 2022

(51) Int. Cl.
*B60W 20/15*     (2016.01)
*F02D 29/06*     (2006.01)
(Continued)

(52) U.S. Cl.
CPC ............ *B60W 20/15* (2016.01); *B60W 10/06* (2013.01); *B60W 10/26* (2013.01); *F02D 29/06* (2013.01);
(Continued)

(58) Field of Classification Search
CPC .... F02D 11/105; F02D 29/06; F02D 200/703; F02D 2200/704; F02D 2200/703;
(Continued)

(56) References Cited

U.S. PATENT DOCUMENTS 8,509,980 B2    8/2013  Abe et al.
2002/0062183 A1*  5/2002  Yamaguchi ............ B60K 6/543
                                                         903/905
(Continued)

FOREIGN PATENT DOCUMENTS

EP    1323564 A2 *  7/2003  ............. B60K 6/442
EP    2 886 839 A1    6/2015
(Continued)

OTHER PUBLICATIONS

EPO machine translation of JP 2007-285248 A with appended abstract (original JP document published Nov. 1, 2007) (Year: 2007).*

(Continued)

*Primary Examiner* — David A Testardi
(74) *Attorney, Agent, or Firm* — Global IP Counselors, LLP

(57) ABSTRACT

A hybrid vehicle control method for a hybrid vehicle is provided for a drive system including an internal combustion engine, a generator that is driven by the internal combustion engine, and a battery that is charged with electric power generated by the generator. A target power generated by the generator is set and the target engine output is calculated for the internal combustion engine according to the target generated power. The air density in the environment in which the vehicle travels is detected. The target engine output is corrected based on the detected air density with respect to the decrease in air density, and the generated power of the generator is made to follow the target generated power. The execution of air density correction is permitted or stopped depending on an operating state of the drive system.

12 Claims, 14 Drawing Sheets

(51) Int. Cl.
*B60W 10/06* (2006.01)
*B60W 10/26* (2006.01)
*F02D 35/00* (2006.01)
*B60K 6/40* (2007.10)

(52) U.S. Cl.
CPC ............... *F02D 35/00* (2013.01); *B60K 6/40* (2013.01); *B60W 2510/0657* (2013.01); *B60W 2510/244* (2013.01); *B60W 2520/10* (2013.01); *B60W 2555/20* (2020.02); *B60W 2710/0666* (2013.01); *B60W 2720/10* (2013.01); *B60Y 2200/92* (2013.01); *B60Y 2300/91* (2013.01); *F02D 2200/50* (2013.01); *F02D 2200/70* (2013.01)

(58) Field of Classification Search
CPC .. B60W 20/10; B60W 20/15; B60W 2555/20; B60W 2555/40; B60W 2510/244; B60L 50/62; B60L 50/61
See application file for complete search history.

(56) References Cited

U.S. PATENT DOCUMENTS

| | | | | |
|---|---|---|---|---|
| 2002/0123836 A1* | 9/2002 | Komiyama | ........... | B60W 10/04 180/65.245 |
| 2002/0130519 A1* | 9/2002 | Nakajima | ............ | B60W 10/08 290/40 C |
| 2002/0157883 A1* | 10/2002 | Ogata | ................... | B60W 20/00 180/65.245 |
| 2005/0189894 A1* | 9/2005 | Komiyama | ........... | B60W 10/08 318/139 |
| 2005/0263333 A1* | 12/2005 | Fujiki | ................... | B60W 10/06 180/65.25 |
| 2006/0199696 A1* | 9/2006 | Gouda | ................. | B60W 20/00 903/905 |
| 2008/0147259 A1* | 6/2008 | Choi | ....................... | B60L 58/10 322/29 |
| 2009/0105043 A1* | 4/2009 | Muta | ...................... | B60K 6/448 477/97 |
| 2012/0072061 A1* | 3/2012 | Kim | ...................... | B60W 20/00 180/65.265 |
| 2012/0185119 A1* | 7/2012 | Abe | ....................... | B60W 20/11 903/902 |
| 2013/0311024 A1* | 11/2013 | Tagawa | ................. | B60W 10/06 180/65.265 |
| 2014/0195084 A1* | 7/2014 | Ueda | ...................... | B60K 6/442 180/65.265 |
| 2015/0027407 A1* | 1/2015 | Darnell | ............... | H01M 10/425 123/399 |
| 2015/0134160 A1* | 5/2015 | Liang | .............. | B60W 30/18054 180/65.265 |
| 2015/0204254 A1* | 7/2015 | Kageyama | .......... | F02D 41/0215 701/110 |
| 2016/0325733 A1* | 11/2016 | Baba | ..................... | B60W 10/06 |
| 2017/0305412 A1* | 10/2017 | Okubo | ................. | B60W 10/06 |
| 2018/0080403 A1* | 3/2018 | Shin | .................... | F02D 41/0097 |
| 2018/0154883 A1* | 6/2018 | Shin | ...................... | B60W 20/10 |
| 2019/0105993 A1* | 4/2019 | Fujiyoshi | ............. | B60W 20/10 |
| 2020/0191069 A1* | 6/2020 | Naidu | ................. | F02D 41/2451 |
| 2020/0309005 A1* | 10/2020 | Yonezawa | ............. | B60W 20/16 |
| 2021/0017931 A1* | 1/2021 | Blake | ................. | F02D 41/2422 |

FOREIGN PATENT DOCUMENTS

| | | | | |
|---|---|---|---|---|
| JP | 2000104590 A | * | 4/2000 | ............ B60K 6/442 |
| JP | 2006183523 A | * | 7/2006 | ............... B60K 6/48 |
| JP | 2007071190 A | * | 3/2007 | |
| JP | 2007-216841 A | | 8/2007 | |
| JP | 2007216900 A | * | 8/2007 | |
| JP | 2007-223403 A | | 9/2007 | |
| JP | 2007223403 A | * | 9/2007 | |
| JP | 2007285248 A | * | 11/2007 | |
| JP | 2008157078 A | * | 7/2008 | |
| JP | 2009255767 A | * | 11/2009 | ............ B60K 6/365 |
| JP | 2009280094 A | * | 12/2009 | |
| JP | 2012091663 A | * | 5/2012 | |
| JP | 2015-98217 A | | 5/2015 | |
| JP | 2017141790 A | * | 8/2017 | ............... B60K 6/48 |
| WO | 2011/114566 A1 | | 9/2011 | |

OTHER PUBLICATIONS

EPO machine translation of JP 2009-255767 A with appended abstract (original JP document published Nov. 5, 2009) (Year: 2009).*

Wikipedia article, "Ideal gas law", old revision dated Mar. 20, 2019, 11 pages (Year: 2019).*

* cited by examiner

CONTROL METHOD FOR HYBRID VEHICLE AND CONTROL DEVICE FOR HYBRID VEHICLE

CROSS-REFERENCE TO RELATED APPLICATIONS

This application is a U.S. national stage application of International Application No. PCT/JP2019/016314, filed on Apr. 16, 2019.

BACKGROUND

Technical Field

The present invention relates to a control method and control device for a hybrid vehicle that includes a generator driven by an internal combustion engine.

Background Information

Hybrid vehicles having an internal combustion engine and a generator configured to be driven by the internal combustion engine in a drive system are known. In regard to the control of such hybrid vehicles, there is a technology for correcting the target output of the internal combustion engine that corresponds to the target generated power of the generator according to the environment in which the vehicle is actually operated. JP2007-216841A discloses taking into consideration intake air density when setting the target output of an internal combustion engine.

Specifically, correction coefficients are set in accordance with the temperature and pressure of the intake air, and the required internal combustion engine output is multiplied by these correction coefficients, thereby setting the target output. When the intake air temperature is high or the intake air pressure is low, the correction coefficients apparently increase the target output, and the desired generated power can be generated by the generator even under the condition of low air density (paragraph 0031).

SUMMARY

According to the technology of JP2007-216841A, in order to realize a target output that has been increased and corrected for decreased density, the throttle opening of the internal combustion engine can be increased in order to take in a larger volume of air into the cylinders. However, this entails the problem that the increased throttle opening may result in poor fuel economy. In internal combustion engines equipped with an EGR device that recirculates part of the exhaust gas into the cylinders, when the throttle opening is increased, the pressure in the intake pipe rises (in other words, the intake negative pressure decreases), so that the EGR rate decreases, which leads to an increase in pumping loss resulting in poor fuel efficiency.

An object of the present invention is to provide a control method and control device for a hybrid vehicle that take into consideration the problems described above.

In one aspect, a method of controlling a hybrid vehicle is provided in which the drive system includes an internal combustion engine, a generator is configured to be driven by the internal combustion engine, and a battery is configured to be charged by the generated power of the generator. In this aspect, the target generated power of the generator is set, and the target engine output, which is the target output of the internal combustion engine corresponding to the target generated power, is calculated. The air density in the environment in which the vehicle travels is detected for a decrease in air density, the target engine output is corrected based on the detected air density, and the generated power of the generator is made to follow the target generated power (air density correction of target engine output). The implementation of the air density correction is then permitted or stopped in accordance with the operating state of the driving system.

In another aspect, a hybrid vehicle control device is provided.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings.

Configuration of Overall Drive System

Figure 1:
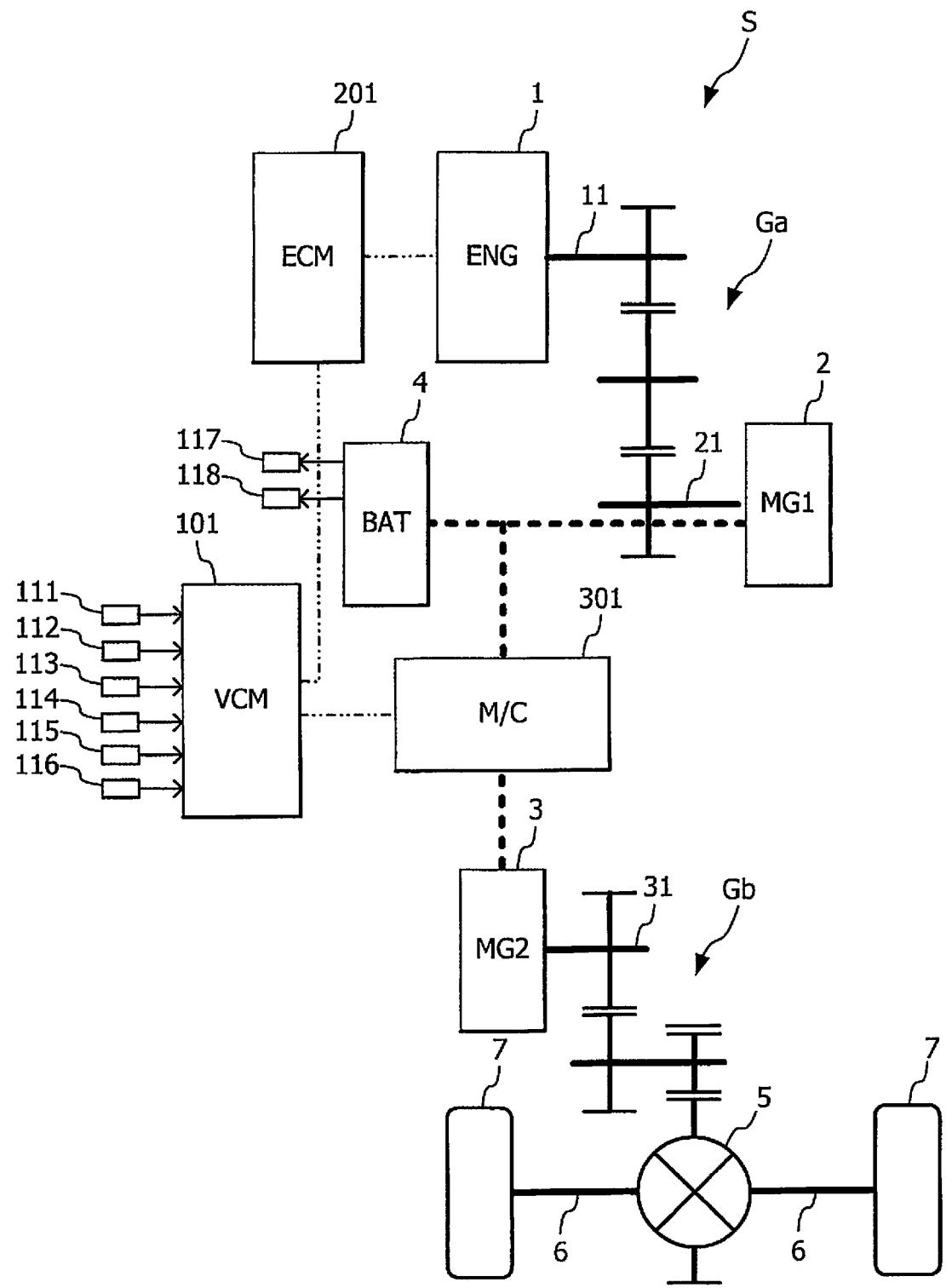
FIG. 1 is a schematic diagram of a configuration of a hybrid vehicle drive system according to one embodiment of the present invention.

FIG. 1 shows the configuration of the overall drive system S of the hybrid vehicle according to one embodiment of the invention.

The drive system (hereinafter, simply referred to as "drive system") S according to the present embodiment is mounted on a hybrid vehicle and forms a propulsion apparatus for the vehicle. The drive system S includes an internal combustion engine 1, an electric motor for power generation (hereinafter "power generating motor") 2, and an electric motor for running (hereinafter called a "travel motor") 3. Here, "hybrid vehicle" means a vehicle equipped with an electric motor as a power source besides the internal combustion engine 1 related to the drive means of the vehicle, and in the present embodiment, the power generated by driving the power generating motor 2 with the internal combustion engine 1 is supplied to the travel motor 3 directly or via the battery 4.

The output shaft or crankshaft 11 of the internal combustion engine (hereinafter simply referred to as "engine") 1 is connected to the rotary shaft 21 of the power generating motor 2 via the gear train Ga. The torque of the engine 1 is transmitted to the power generating motor 2 at a prescribed gear ratio through the gear train Ga, and the power generating motor 2 operates.

The power generating motor 2, which is connected to the battery 4 and electrically connected to the travel motor 3, supplies the power that is generated by receiving power from the engine 1 to the travel motor 3 or the battery 4. The electric power supplied from the power generating motor 2 to the travel motor 3 and from the battery 4 to the travel motor 3 are controlled by a motor controller 301 according to the operating state of the vehicle and the state of charge of the battery 4. In FIG. 1, the electrical connections among the power generating motor 2, the travel motor 3, and the battery 4 are schematically indicated by a double-dot dashed line.

A rotary shaft 31 of the travel motor 3 is connected to a ring gear of a differential 5 via a gear train Gb. The torque of the travel motor 3 is transmitted to the differential 5 at a prescribed gear ratio through the gear train Gb, and further distributed to left and right drive shafts 6, 6 via the differential 5 to rotate drive wheel 7 to propel the vehicle.

In the present embodiment, the travel motor 3 is composed of a motor/generator that can operate not only as an electric motor but also as a generator, and is capable of receiving power from the drive wheel 7 via the gear train Gb and generating electric power. The electric power generated by the travel motor 3 can be supplied to the battery 4 and used to charge the battery 4.

Basic Configuration and Operation of the Control System

The operation of the engine 1, the power generating motor 2, and the travel motor 3 is integrally controlled by a vehicle controller 101. Although not limited in this way, the vehicle controller 101 and an engine controller 201, which will be described further below, are constituted by a microcomputer equipped with a central processing unit (CPU), various storage units such as ROM and RAM, an input/output interface, etc., as an electronic control unit.

Information regarding various parameters indicating the operating state of the vehicle is input to the vehicle controller 101. In the present embodiment, a signal indicating the degree of depression of the accelerator pedal by the driver (hereinafter referred to as "accelerator opening") APO, a signal indicating the vehicle travel speed (hereinafter referred to as "vehicle speed") VSP, a signal indicating the rotational speed Neng of engine 1, a signal indicating the rotational speed Nmg1 of the power generating motor 2, and a signal indicating the rotational speed Nmg2 of the travel motor 3 are input to vehicle controller 101. Also, a signal indicating the air temperature Tatm outside the vehicle is input as information on the environmental conditions in which the vehicle travels. In addition, sensors for the detection of various parameters are provided: an accelerator opening sensor 111 that detects the accelerator opening APO, a vehicle speed sensor 112 that detects the vehicle speed VSP, an engine rotational speed sensor 113 that detects the rotational speed Neng of the engine 1 as the number of revolutions per unit time (hereinafter called "engine rotational speed"), a power generation motor rotational speed sensor 114 that detects the rotational speed Nmg1 of the power generating motor 2, a travel motor rotational speed sensor 115 that detects the rotational speed Nmg2 of the travel motor 3, and an air temperature sensor 116 that detects the air temperature Tatm.

The vehicle controller 101 performs a prescribed operation based on various input signals and outputs a command signal to the engine controller 201 and the motor controller 301. The engine controller 201 controls the operation of the engine 1 via an engine control device such as a throttle valve and a fuel injection valve based on a command signal from the vehicle controller 101. The motor controller 301, on the other hand, controls the power supplied from the power generating motor 2 and the battery 4 to the travel motor 3 based on a command signal from the vehicle controller 101, and controls the operation of the travel motor 3. A controller, not shown in the figure, is provided for controlling the operation of the power generating motor 2 and the battery 4.

Here, the vehicle controller 101 sets the target generated power of the power generating motor 2 with respect to the control of the engine 1, and also calculates the target engine output, which is the target output of the engine 1 according to the target generated power. The vehicle controller 101 then instructs the engine controller 201 to operate at the target engine output. More specifically, the vehicle controller 101 calculates the engine rotational speed and engine torque that define the operating point for the engine 1 with the lowest fuel consumption rate [g/kWh] (hereinafter may be referred to as "best fuel consumption rotational speed" and "best fuel consumption torque," respectively) as the engine rotational speed and engine torque that can realize the target engine output; that is, the vehicle controller instructs the operation at the best fuel consumption point (hereinafter referred to as "best fuel consumption point") in accordance with the target engine output. In general, the engine controller 201 sets the target engine rotational speed and the target engine torque to the best fuel consumption rotational speed and the best fuel consumption torque, respectively, to control the actual torque and rotational speed of engine 1 for realizing the target engine torque and target engine rotational speed. In the following explanation "fuel consumption" refers to the fuel consumption rate [g/kWh].

Overview of Air Density Correction

In this embodiment, the engine controller 201 introduces a correction based on air density (hereinafter called "air density correction") to control the engine torque. The air density correction is generally realized as a correction for increasing the target engine output such that the actual generated power of the power generating motor 2 can follow the target generated power regardless of air density in response to decreases in air density in the environment in which the vehicle travels. During travel decreased air density occurs not only at high altitudes, but also in high-temperature areas or even when the temperature increases in the same area.

However, by means of the air density correction, the throttle opening of the engine 1 can be increased in order to bring a greater amount of air into the cylinders of engine 1 in order to realize a target engine output that is increased with respect to a decreased air density. Consequently, in the present embodiment, since the pressure in the intake pipe is increased and the intake negative pressure is decreased, the EGR rate decreases, which results in increased pumping loss and poor fuel efficiency.

Figure 2:
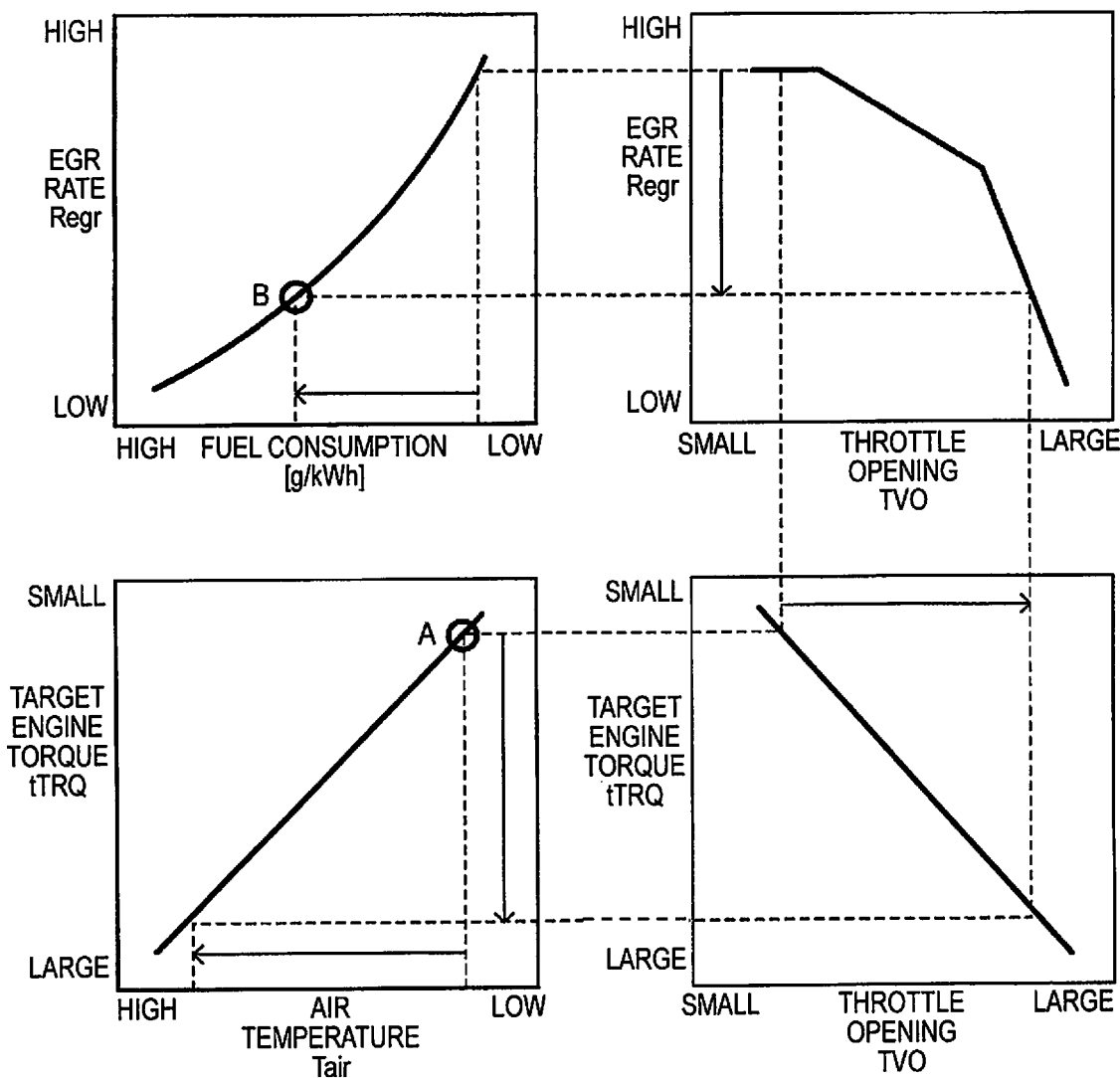
FIG. 2 are explanatory diagrams illustrating the effect of the air density correction on the fuel consumption rate according to the same embodiment.

FIG. 2 shows the effect of the air density correction on fuel consumption from the standpoint point of variations in fuel consumption with respect to an increase in air temperature Tair.

In FIG. 2, the target engine torque tTRQ, which is the value indicated by A, is increased by the air density correction with respect to a decrease in air density due to an increase in air temperature Tair. When the throttle opening TVO is increased by the engine control based on the corrected target engine torque tTRQ, the ratio of the recirculated exhaust gas to the total intake gas, that is, the EGR rate Regr, decreases due to the decrease in the intake negative pressure. Thus, since the pumping loss of the engine 1 increases, the fuel consumption rate of the engine 1 increases (the value after the increase is indicated by B), and the operating efficiency of the engine 1 deteriorates.

Therefore, in the present embodiment, in addition to the air density correction, an operation for suppressing the deterioration in operating efficiency is introduced, wherein the execution of the air density correction is stopped while permitting a decrease in actual engine torque TRQ to the extent possible.

Basic Operation of Air Density Correction and Correction Cancellation

Figure 3:
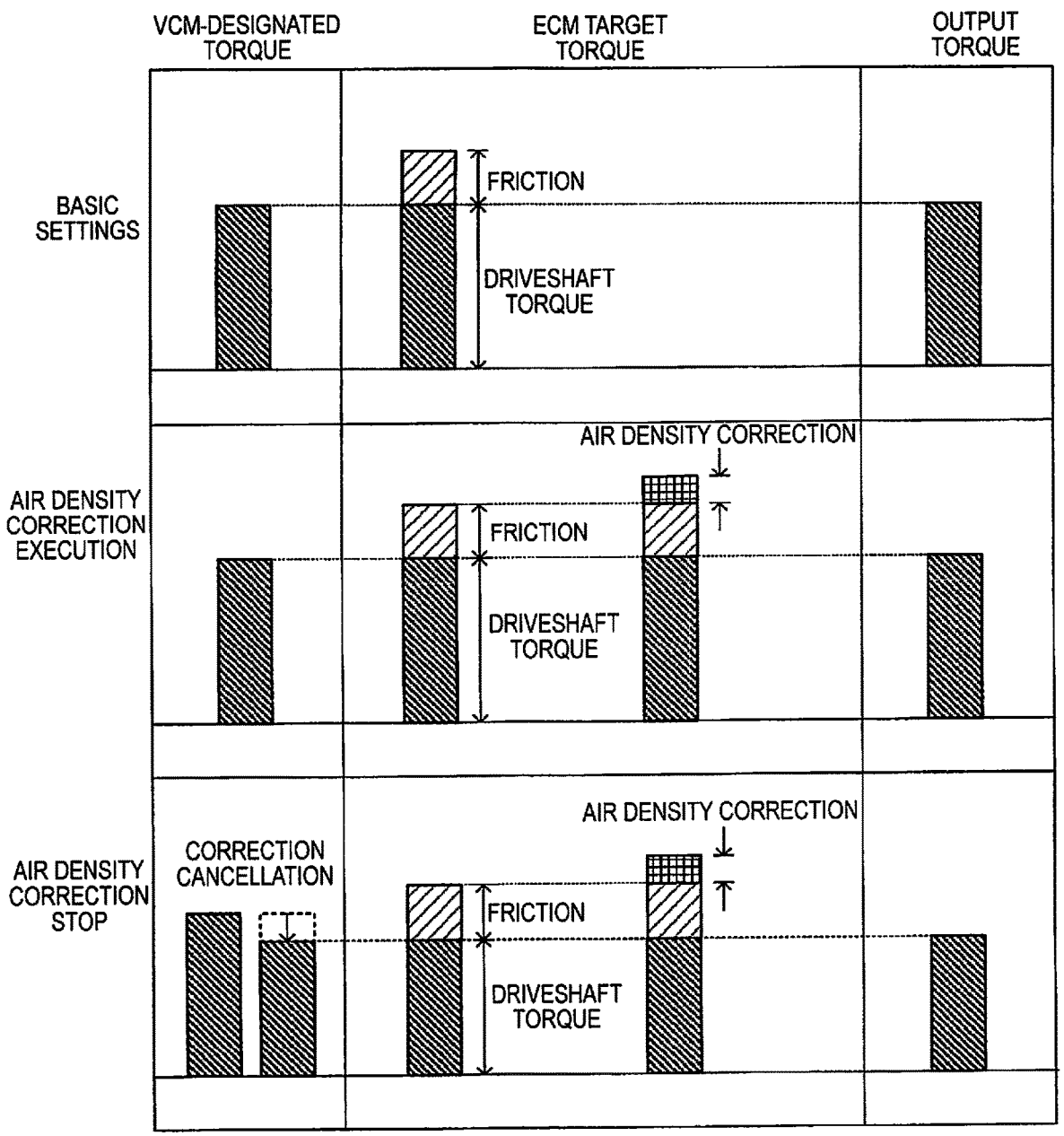
FIG. 3 are explanatory diagrams illustrating cancellation operations (correction cancellation) of air density correction according to the same embodiment.

FIG. 3 conceptually shows an operation according to this embodiment (hereinafter may be referred to as "correction cancellation") for stopping the execution of the air density correction. For purposes of comparison, the upper portion of FIG. 3 shows the case in which the basic setting is performed, the middle portion shows the case in which the air density correction is performed, and the lower portion shows the case in which the air density correction is stopped by a correction cancellation.

In the case of the basic setting, the vehicle controller 101 calculates a target engine torque tTRQ (VCM-designated torque) according to the target generated power of the power generation motor 2, and outputs the calculated target engine torque to the engine controller 201. The engine controller 201 then adds a torque equivalent to the friction to the target engine torque, and the post-addition target engine torque (ECM target torque) is set as the final target engine torque. The engine controller 201 outputs a command signal based on the final target engine torque to an engine control device such as a fuel injection valve. The engine 1 basically outputs a torque equivalent to the target engine torque (VCM-designated torque) tTRQ instructed by the vehicle controller 101.

On the other hand, when an air density correction is performed, the torque equivalent to the friction and the torque for the air density correction are added to the target engine torque tTRQ instructed by the vehicle controller 101, and the post-addition target engine torque is set as the final target engine torque. The torque of the air density correction compensates for the shortfall due to a decrease in air density. The "air density correction" is realized by adding the torque of the air density correction to the target engine torque. Due to the instruction based on the final target engine torque, engine 1 outputs a torque equivalent to the target engine torque tTRQ indicated by the vehicle controller 101.

Furthermore, if the implementation of air density correction is stopped, the vehicle controller 101 carries out an operation in which the torque for the correction cancellation corresponding to the air density correction amount is subtracted from the target engine torque tTRQ according to the target generated power of the power generating motor 2, and the target engine torque (VCM-designated torque) after subtraction is output to the engine controller 201. The engine controller 201 adds the torque equivalent to friction and the torque for the air density correction to the target engine torque, and the post-addition target engine torque is set as the final target engine torque. Therefore, in the case in which the execution of the air density correction is stopped, the final target engine torque is reduced by the torque of the correction cancellation as compared to the case in which the air density correction is performed. The torque output by the engine 1 is also lower than the target engine torque tTRQ according to the target generated power due to the fact that the final target engine torque is lowered by the torque of the correction cancellation.

In this embodiment, the air density correction operation is stopped by previously subtracting the correction cancellation torque from the target engine torque tTRQ according to the target generated power, but the operation of stopping the implementation of the air density correction is not limited thereto. For example, it is possible to stop the operation of adding the torque for the air density correction itself, or to add the torque for the air density correction but subtract the torque for the correction cancellation from the target engine torque after the addition.

Figure 4:
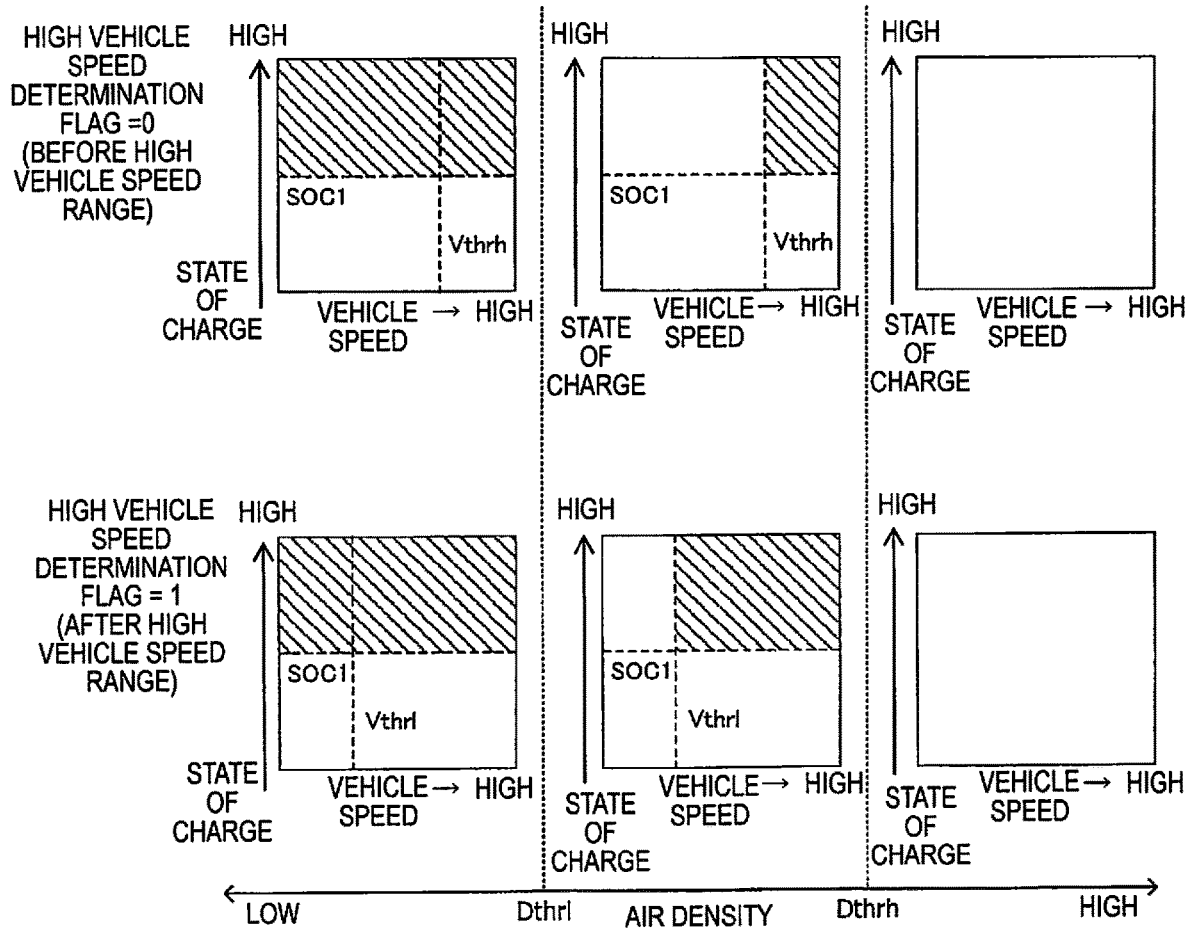
FIG. 4 are explanatory diagrams illustrating the implementation area (cancellation region) of correction cancellation according to the same embodiment.

FIG. 4 shows the region in which the correction cancellation is performed (hereinafter may be referred to as the "cancellation region"). As mentioned above, the correction cancellation is performed while permitting the actual engine torque to decrease to the extent possible, in other words, to the extent that the engine torque does not substantially affect the management of the state of charge of the battery 4, even if the engine torque is insufficient for the target engine torque tTRQ. The cancellation region makes the area clear, and in FIG. 4, the cancellation region is indicated by the shaded area.

In this embodiment, the cancellation region is determined based on the relationship between the vehicle speed VSP and the state of charge SOC of the battery 4. Whereas the air density correction is basically applied to a decrease in air density Dair, when the air density Dair drops below a prescribed density Dthr, a cancellation region is set for stopping the execution of the air density correction. This is because the lower the air density Dair, the greater the air density correction that must be applied and the larger the throttle opening that is required to secure the output, which causes the fuel consumption rate to deteriorate.

Specifically, when the air density Dair is less than a first prescribed density Dthrh, which is relatively high, a cancellation region is set. If the air density Dair is less than a second prescribed density Dthrl, which is lower than the first prescribed density Dthrh, a cancellation region is set over the entire area of the vehicle speed VSP, whereas the cancellation region is set for the case in which the vehicle speed VSP is in the high vehicle speed range from the second prescribed density Dthrl to the first prescribed density Dthrh. In this embodiment, when it is determined that the vehicle speed VSP has reached the high vehicle speed range from the low vehicle speed range outside of the high vehicle speed range (hereinafter referred to as "high vehicle speed determination"), the determination is made when the vehicle has returned from the high vehicle speed range to the low vehicle speed range (hereinafter referred to as "cancellation of high vehicle speed determination"), a difference, that is, a hysteresis is applied to the determination threshold (Vthr). Specifically, when a high vehicle speed determination is made, the relatively high first prescribed vehicle speed Vthrh is used as the threshold, and when high vehicle speed determination is canceled, the second prescribed vehicle speed Vthrl, which is lower than the first prescribed vehicle speed Vthrh, is used as the threshold.

Further, in the present embodiment, when the battery 4 is in a highly charged state, a correction cancellation is performed, and the range for setting the cancellation region is limited to the case in which the state of charge SOC of the battery 4 is greater than or equal to a prescribed SOC1. A threshold value (SOC1) is also set for determining the state of charge SOC of the battery 4, and hysteresis is applied thereto. Specifically, when the charged state SOC rises (during charging), it is determined that the charged state is a high charged state when the first prescribed charge state SOC1a or higher, which is relatively high, is determined. When the SOC drops (during discharging), it is determined that the charge state is a low charged state when the charge state is lower than the first prescribed charge state SOC1a and lower than a second prescribed charge state SOC1b. FIG. 4 omits the display of hysteresis related to state of charge SOC for clarity.

Figure 5:
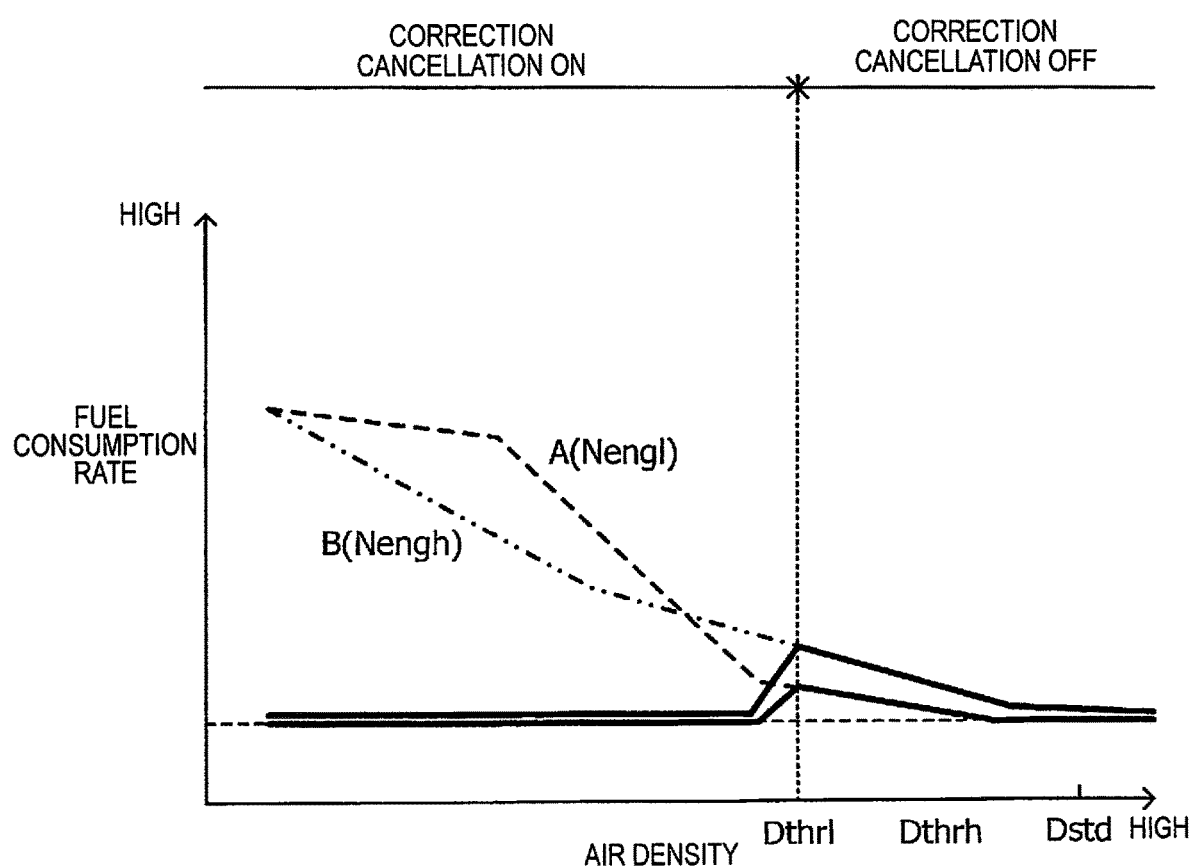
FIG. 5 is an explanatory diagram showing the effect of air density correction and correction cancellation on the fuel consumption rate according to the same embodiment.

FIG. 5 shows the effects of air density correction and correction cancellation on fuel consumption for two different operating points A and B. Operating point A is the operating point (engine rotational speed Nengl) set for the low vehicle speed range, and operating point B is the operating point (engine rotational speed Nengh) set for the high vehicle speed range. In this embodiment, both operating points A and B are the best fuel economy points of the engine 1. In FIG. 5, Dstd shows air density at standard atmospheric pressure (=1 ATM) (hereinafter called "reference density").

In the case of either of operating points A and B, fuel consumption will increase with the execution of air density correction in response to a decrease in air density Dair. The dotted line shows the fuel consumption at operating point A on the low-rotational speed side, and the double-dotted line shows the fuel consumption at operating point B on the high-rotational speed side. Here, by stopping the execution of the air density correction with a prescribed density Dthr (for example, a prescribed density Dthrl on the low density side) as a boundary, fuel consumption can be reduced, as shown by the thick solid line, and converged to the same fuel consumption (that is, the best fuel consumption) level as in the reference density Dstd.

Operation Schedule Example

Figure 6:
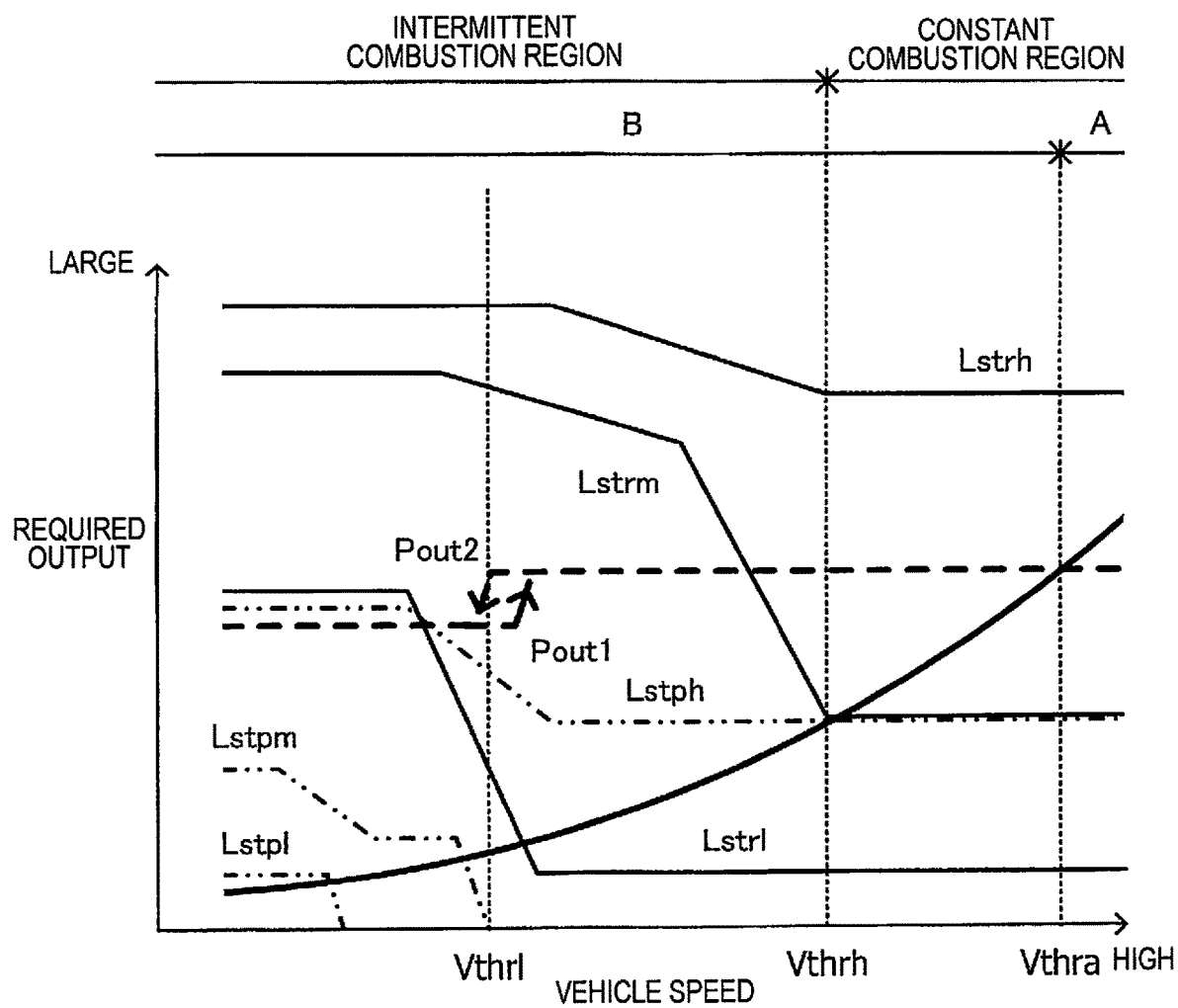
FIG. 6 is an explanatory diagram showing an operation schedule of the internal combustion engine during travel on a flat road according to the same embodiment.

FIG. 6 shows the operation schedule according to the vehicle speed VSP of the engine 1 at the time of flat road driving. In FIG. 6, the solid line Lstr indicates the start line of the engine 1 for the different states of charge SOCs of the battery 4, and the double-dotted line Lstp indicates the stop line of the engine 1 for each state of charge for SOC in association with the start line. The start lines Lstrh, Lstrm, and Lstrl correspond to cases in which the state of charge SOC is high in that order, and the operation stop lines Lstph, Lstpm, and Lstpl also correspond to cases in which the state of charge SOC is similarly high in that order. The dotted line indicates the output at the best fuel consumption point of the engine 1 (the generated power of the power generating motor 2, hereinafter referred to as "fixed point output") Pout. In the example shown in FIG. 6, the output Pout1 on the low output side corresponds to operating point A shown in FIG. 5, and the output Pout2 on the high output side corresponds to the operating point B. In this embodiment, when the output is increased to operating point B at the vehicle speed when the driving points A and B are switched, hysteresis is applied between operating point B and the case in which the output returns from operating point B to operating point A.

The operation schedule of the engine 1 is determined according to the required output for the drive system S, the vehicle speed VSP, and the state of charge SOC of the battery 4. In the operation schedule shown in FIG. 6, the engine 1 starts at the time point when the required output is increased and the corresponding start line Lstr is reached under the actual state of charge SOC. When the engine 1 is started, the power generating motor 2 starts power generation and the battery 4 is charged, so that the operation stop line Lstp is sequentially switched to those on the high charging state side. After starting, the engine 1 stops when the operation stop line Lstp corresponding to the state of charge SOC is reached.

Based on this principle of operation, referring to FIG. 6, the engine 1 is started when the required output reaches the starting line Lstrm at a prescribed vehicle speed Vthr (e.g., the first prescribed vehicle speed Vthrh). Thereafter, if the high charge state is maintained, since the operation stop line Lstph is lower than the required output, the engine 1 is not stopped and combustion is continued (continuous combustion region). Here, in the range where the required output exceeds the fixed point output Pout (=Pout2), the energy consumption of the battery 4 exceeds the power supplied by the engine 1, so the state of charge SOC is kept low, the operation stop line Lstp is switched to the low state of charge side (e.g., Lstpm), and combustion is continued.

On the other hand, in the region on the vehicle speed side below the prescribed vehicle speed Vthr (=Vthrh), the engine 1 starts and stops repeatedly (intermittent combustion region) due to the repeated passing of the stop line Lstp due in turn to the rise of the state of charge SOC after the required output reaches the start line Lstr (e.g., start line Lstrl or the lower charging side start line). In other words, until the prescribed vehicle speed Vthr is reached, the mode changes intermittently between the series hybrid driving mode, in which the power generating motor 2 is driven by the engine 1 and the battery 4 is charged, and EV driving mode, in which the engine 1 is stopped and the vehicle is driven by the travel motor 3. As a result, the state of charge SOC of the battery 4 increases or decreases, and the starting and stopping of engine 1 is repeated. However, even in the region on the low vehicle speed side, in the range where the vehicle speed is relatively high, since the state of charge SOC is maintained at a high level, the frequency of stopping the engine 1 is decreased.

In this way, the cancellation region can be determined not only by the vehicle speed VSP, but also by the combustion state of the engine 1. For example, it is possible to determine whether the combustion state is continuous or intermittent from the relationship between the fixed point output Pout and the required output, and it is also possible to define the range in which the required output exceeds the fixed point output Pout (indicated by reference numeral A in FIG. 6) as the continuous combustion region, and the remaining range (indicated by reference numeral B) as the intermittent combustion region. In this case, the vehicle speed Vthra at which the required output matches the fixed point output Pout becomes the "prescribed vehicle speed." In the example operation schedule described above, although the vehicle speed Vthrh (<Vthra) is set as the boundary between the continuous combustion region and the intermittent combustion region, the extent to which the continuous combustion region can be expanded to the low vehicle speed side from the range A, that is, the extent to which the boundary between the continuous fuel region A and the intermittent combustion region B can be pushed down from the state shown in the figure to the low vehicle speed side is determined by the charge management of the battery 4.

Flowchart Description

Figure 7:
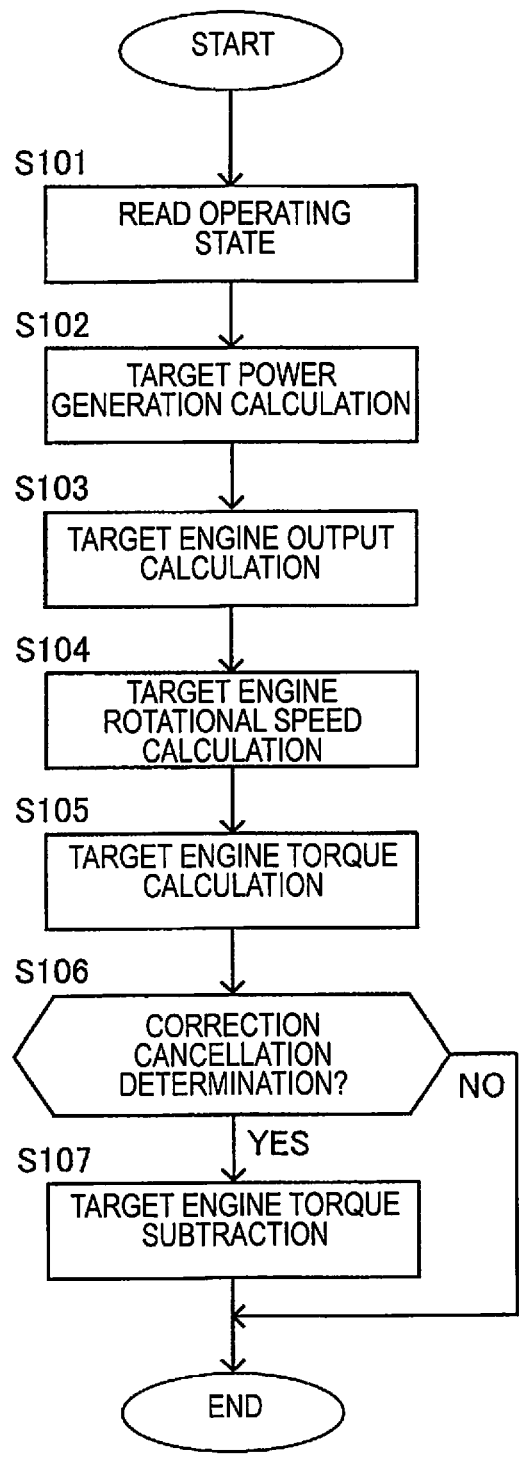
FIG. 7 is a flowchart of the target engine torque calculation routine according to the same embodiment.
Figure 8:
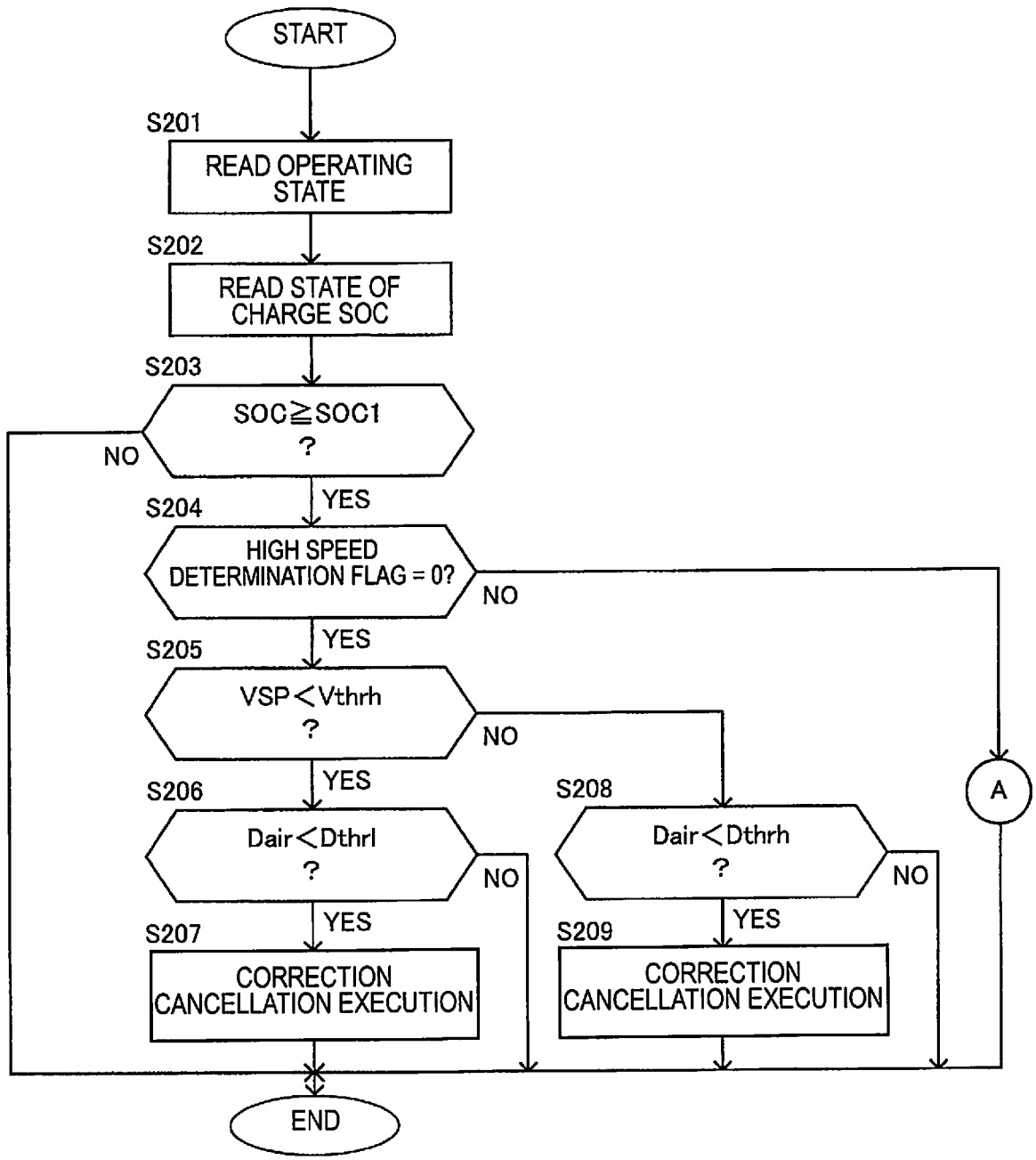
FIG. 8 is a flowchart of a correction cancellation execution determination routine (cancellation determination routine) according to the same embodiment.
Figure 9:
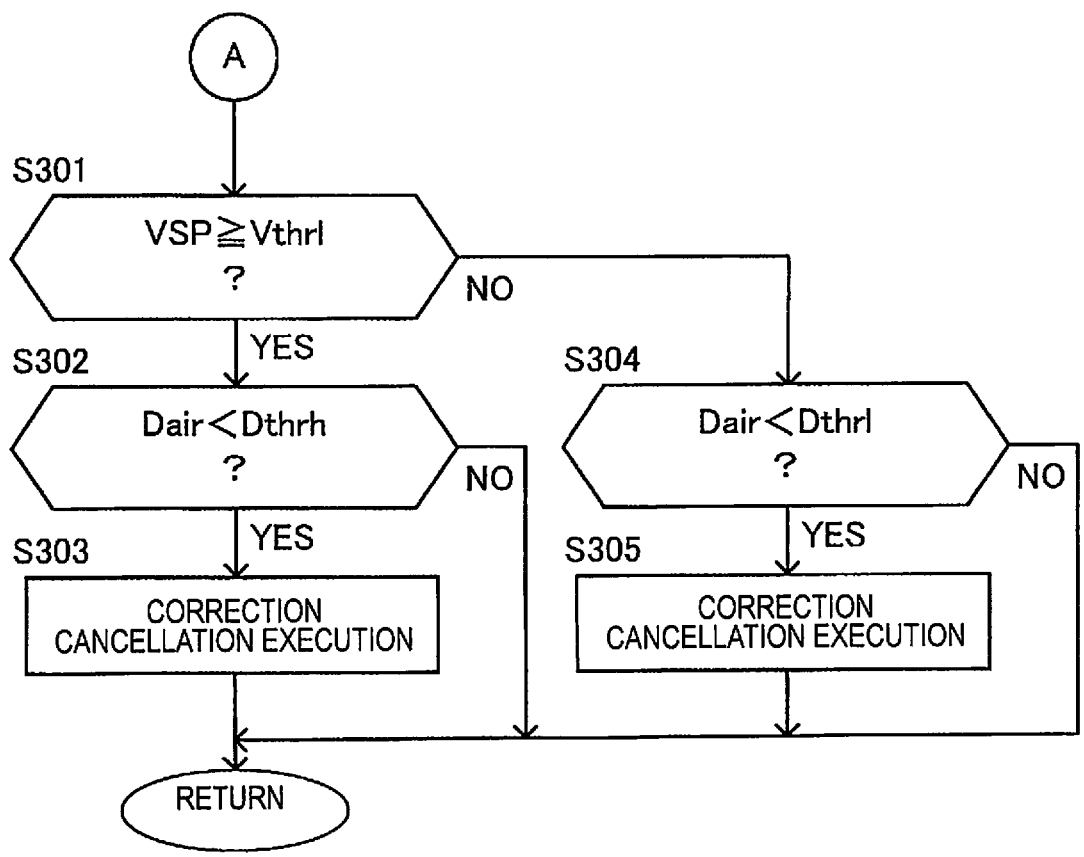
FIG. 9 is a flowchart showing the processing steps executed in part A of the cancellation determination routine (FIG. 8) according to the same embodiment.
Figure 10:
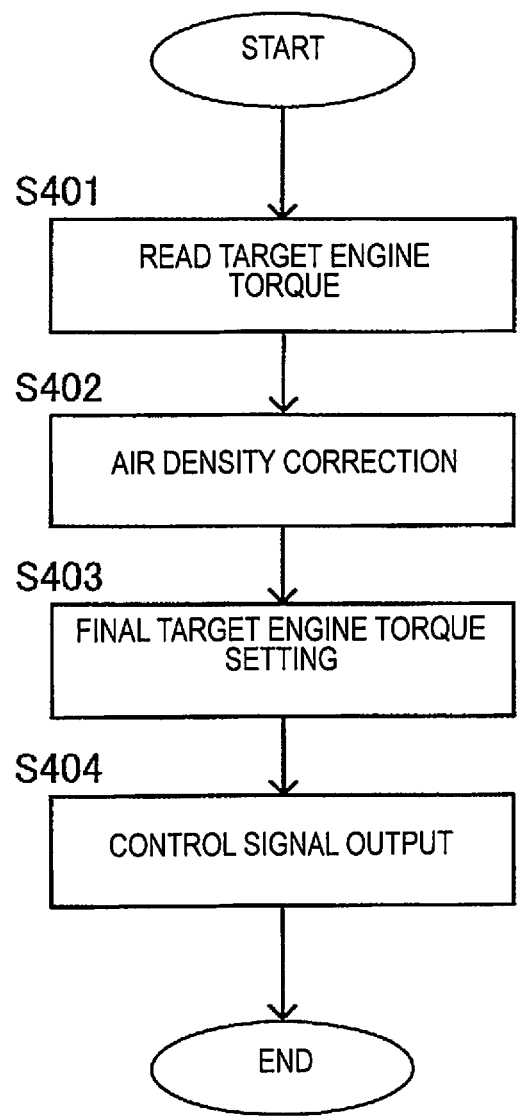
FIG. 10 is a flowchart of an engine control routine according to the same embodiment.

The operation of the vehicle controller 101 and the engine controller 201 will be described with reference to the flowcharts in FIGS. 7 to 10. FIGS. 7 to 9 show the operation of the vehicle controller 101, and FIG. 10 shows the operation of the engine controller 201. The vehicle controller 101 and the engine controller 201 are programmed to perform the controls shown in FIGS. 7 to 9 and 10 at prescribed intervals.

FIG. 7 is a flowchart of the target engine torque calculation routine.

In S101, the operating state of the vehicle, including the accelerator opening degree APO and the vehicle speed VSP, is read.

In S102, the target generated power of the power generating motor 2 is calculated based on the operating state of the vehicle.

In S103, the target engine output, which is the target output of the engine 1, is calculated based on the target generated power.

In S104, the target engine rotational speed is calculated based on the target engine output. The calculation of the target engine rotational speed is based on a search for the optimal fuel consumption point corresponding to the target engine output. Specifically, an optimal fuel consumption line (hereinafter referred to as "a line") for the engine 1 that connects the optimal fuel consumption points on the equal output line for each output is predetermined and is converted into data and stored in the vehicle controller 101. The vehicle controller 101 specifies the optimal fuel consumption point corresponding to the target engine output on the α-line, and calculates the rotational speed at the optimal fuel consumption point as the target engine rotation speed.

In S105, the target engine torque is calculated. Specifically, the torque at the optimal fuel consumption point is calculated as the target engine torque.

In S106, it is determined whether a correction is in the area where a cancellation correction should be performed. This determination is made with reference to the map data shown in FIG. 4 and will be explained in detail with reference to FIG. 8. If it is in the cancellation region, the process proceeds to S107, and if it is not in the cancellation region, the control by the routine is ended.

In S107, the correction cancellation is implemented and the execution of the air density correction by the engine controller 201 is essentially stopped. The specific contents of the correction cancellation have already been described with reference to FIG. 3.

FIG. 8 is a flowchart of the correction cancellation determination routine (hereinafter referred to as the "cancellation determination routine"). In this embodiment, the cancellation determination routine is executed as a process called in S106 of the flowchart shown in FIG. 7.

In S201, the operating state of the vehicle is read. Specifically, the vehicle speed VSP and the air density Dair are read. The air density Dair is calculated based on the air temperature Tatm by a separately set air density calculation routine.

In the S202, the battery 4 state of charge SOC is read. The state of charge SOC can be calculated based on the open circuit voltage and charge/discharge current of the battery 4 using a separately set state of charge calculation routine. The open circuit voltage of the battery 4 can be detected by the voltage sensor 117, and the charge/discharge current can be detected by the current sensor 118.

In S203, it is determined whether the state of charge SOC is greater than or equal to the prescribed state of charge SOC1, that is, whether the battery 4 is in the highly charged state. As previously described, hysteresis is applied in the prescribed state of charge SOC1 at the time of charging and discharging the battery 4. If it is in a high state of charge, the process proceeds to S204. On the other hand, if it is not in a high state of charge but in a low state of charge, it is not in the area (cancellation region) where a correction cancellation should be performed, and the process returns to the flowchart shown in FIG. 7. In this case, the determination of S106 is denied, and air density correction is permitted.

In S204, it is determined whether the high vehicle speed determination flag Fvsp is 0. When the vehicle is in the low vehicle speed range, the high vehicle speed determination flag Fvsp is set to 0 (that is, the initial value set at the start of the system S is 0), and when the vehicle speed VSP reaches the first prescribed vehicle speed Vthrh from the low vehicle speed range and the vehicle experiences a vehicle speed greater than or equal to the first prescribed vehicle speed Vthrh, this flag is switched to 1. Then, when the vehicle speed VSP is lowered to the second prescribed vehicle speed Vthrl and deviates from the high vehicle speed range, this flag is reset to 0. Thus, in this embodiment, whether the high vehicle speed determination flag Fvsp is 0 or 1, determines whether the boundary between when the low vehicle speed range and the high vehicle speed range (Vthrh, Vthrl) is switched. When the high vehicle speed determination flag Fvsp is 0, the process proceeds to S205, and if it is 1, the process proceeds to step S301 shown in FIG. 9.

In S205, it is determined whether the vehicle speed VSP is less than the first prescribed vehicle speed Vthrh. If the vehicle speed is less than the first prescribed vehicle speed Vthrh, the process proceeds to S206, and if the vehicle speed is greater than or equal to the first prescribed vehicle speed Vthrh, the process proceeds to S208.

In S206, it is determined whether the air density Dair is less than the second prescribed density Dthrl. If the density is less than the second prescribed density Dthrl, the process proceeds to S207. On the other hand, if the density is greater than or equal to the second prescribed density Dthrl, it is assumed that the density is not in the cancellation region, and the process returns to the flowchart shown in the FIG. 7. In this case, the determination of S106 is denied, and air density correction is permitted.

After it has been determined that the density is in the cancellation region, in S207, the process returns to the flowchart shown in FIG. 7. Here, the process proceeds from S106 to S107, and the correction cancellation is performed.

In S208, it is determined whether the air density Dair is less than the first prescribed density Dthrh. If the air density is less than the first prescribed density Dthrh, the process proceeds to S209. On the other hand, if the air density is greater than or equal to the first prescribed density Dthrh, it is assumed that the air density is not in the cancellation region, and the process returns to the flowchart shown in FIG. 7. In this case, the determination of S106 is denied, and air density correction is permitted.

After it has been determined that the air density is in the cancellation region, in S209 the process returns to the flowchart shown in FIG. 7. In this case, the process proceeds from S106 to S107, and the correction cancellation is performed.

FIG. 9 shows a flowchart of the process performed in section A of the cancellation determination routine shown in FIG. 8.

In S301, it is determined whether the vehicle speed VSP is greater than or equal to the second prescribed vehicle speed Vthrl. If the speed is greater than or equal to the second prescribed vehicle speed Vthrh, the process proceeds to S302. If the speed is less than the second prescribed vehicle speed Vthrl, the process proceeds to S304.

In S302, it is determined whether the air density Dair is less than the first prescribed density Dthrh. If the air density is less than the first prescribed density Dthrh, the process proceeds to S303. On the other hand, if the air density is greater than or equal to the first prescribed density Dthrh, it is assumed that the air density is not in the cancellation region, and the process returns to the flowchart shown in FIG. 7. In this case, the determination of S106 is denied, and air density correction is permitted.

After it has been determined that the air density is in the cancellation region, in S303 the process returns to the flowchart shown in FIG. 7. Here, the process proceeds from S106 to S107, and the correction cancellation is performed.

In S304, it is determined whether the air density Dair is less than the second prescribed density Dthrl. If the air density is less than the second prescribed density Dthrl, the process proceeds to S305. On the other hand, if the density is greater than or equal to the second prescribed density Dthrl, it is assumed that the density is not in the cancellation region and the process returns to the flowchart shown in FIG. 7. In this case, the determination of S106 is denied, and the air density correction is permitted.

After it has been determined that the air density is in the cancellation region, in S305 the process returns to the flowchart shown in FIG. 7. Here, the process proceeds from S106 to S107, and correction cancellation is performed.

FIG. 10 is a flowchart of the engine control routine.

In S401, the target engine torque is read.

In S402, the target engine torque is corrected by the air density correction to compensate for the decrease in air density Dair. Specifically, the torque equivalent to the air density decrease is added to the target engine torque.

In S403, the post-addition torque is set as the final target engine torque.

At S404, a command signal to various engine control devices is output based on the final target engine torque.

In this embodiment, the vehicle controller 101 and the engine controller 201 constitute the "engine controller." Among the processes performed by the vehicle controller 101, the function of the "target engine output calculation section" is realized by the processing steps of S103 to S105, the function of the "air density detection section" is realized by the processing step of S201, the function of the "target engine output correction section" is realized by the processing step of S402, and the function of the "correction execution switching section" is realized by the processing steps of S106, S107, S203 to S209, and S301 to S305, respectively. The function to be provided by the "engine controller" can be not only shared between the vehicle controller 101 and the engine controller 201, but also provided by a single controller.

Time Chart Description

Several examples of the behavior of the drive system S for cancellation determination are described by the time chart.

Figure 11:
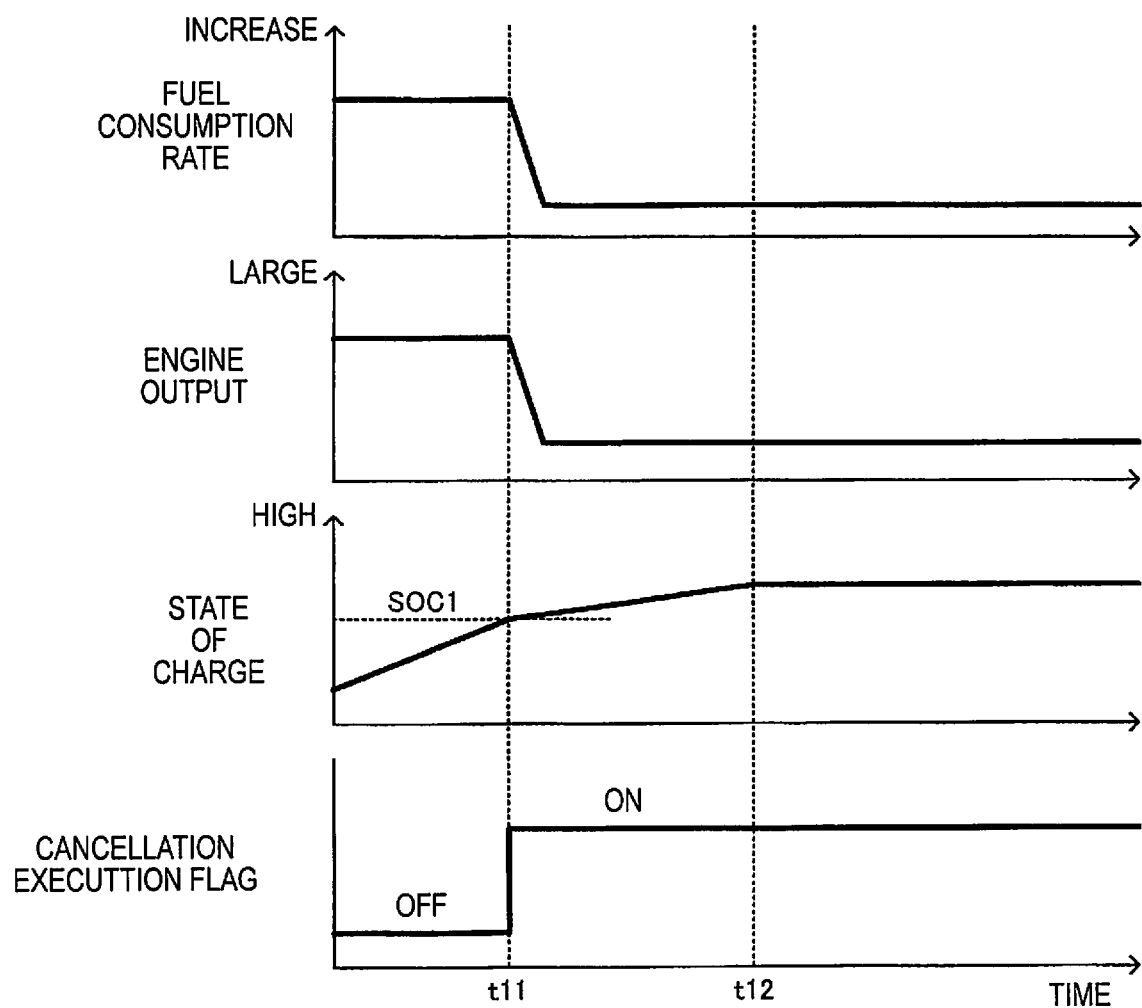
FIG. 11 is an explanatory diagram illustrating a cancellation determination when the state of charge is restored.

FIG. 11 shows an example in which the battery 4 state of charge SOC is restored. If the battery 4 is in a low charge state, the air density correction is performed by determining that the air density is not in the cancellation region even though the air density Dair is low (cancellation execution flag off). When the state of charge SOC rises and reaches the prescribed state of charge SOC1 (time t11), there is a switch to the determination that the air density is in the cancellation region (cancellation execution flag on), and the correction cancellation is performed. As a result, the execution of air density correction is stopped, and the efficiency of operation is promoted by reducing the fuel consumption while reducing engine torque. Here, the change in fuel economy (fuel consumption rate) and engine output have a gradient, which is due to a control for the purpose of preventing sudden changes.

Figure 12:
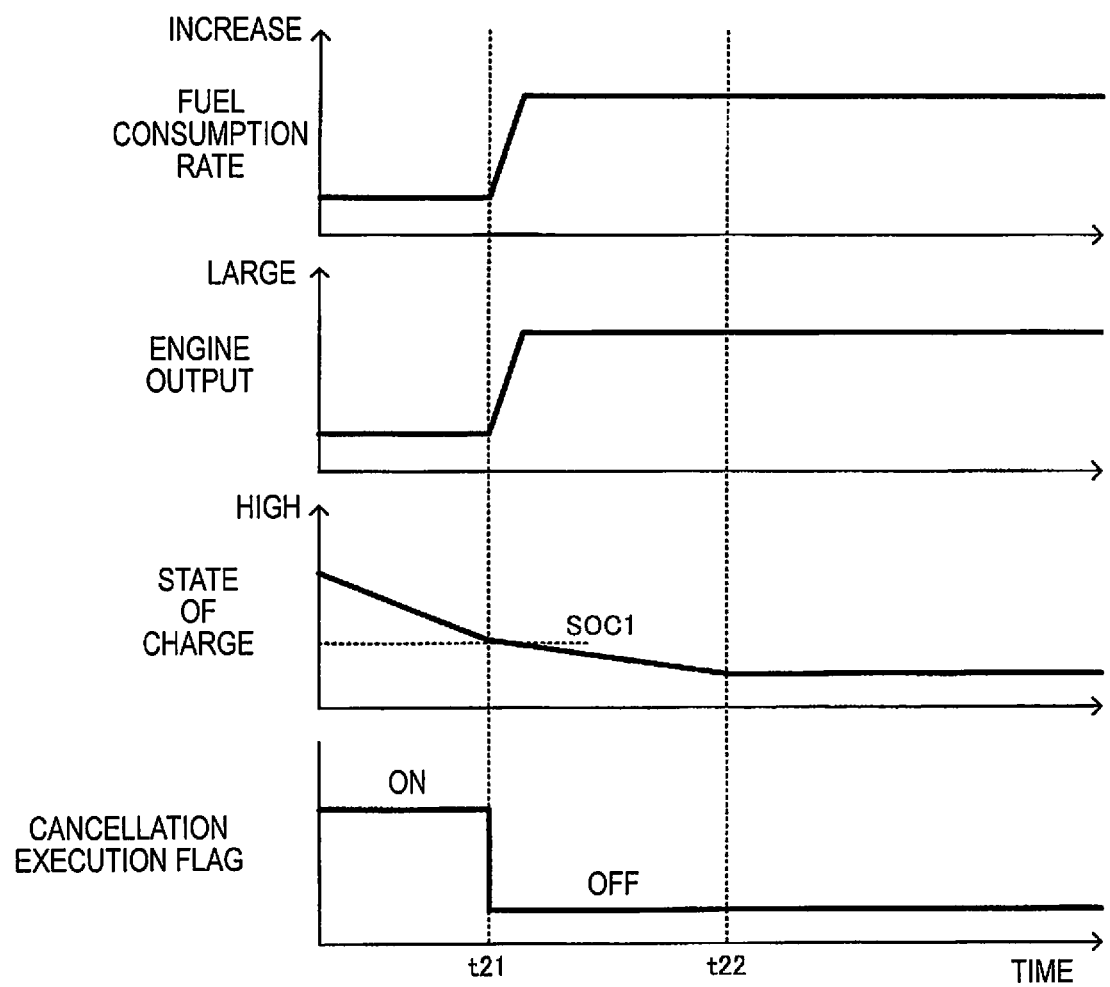
FIG. 12 is an explanatory diagram showing a cancellation determination when the state of charge deteriorates.

FIG. 12 shows an example in which the state of charge SOC of the battery 4 has deteriorated. If the battery 4 is in a high charge state, it is assumed that the air density Dair is in a low environment and the execution of the air density correction is stopped by the determination that the air density is in the cancellation region (cancellation execution flag on). When the state of charge SOC decreases and reaches the prescribed state of charge SOC1 (time t21), there is a switch to the determination that the air density is not in the correction cancellation region (cancellation execution flag off), and the execution of the correction cancellation is stopped. As a result, the air density correction is performed, and the engine torque increases.

Figure 13:
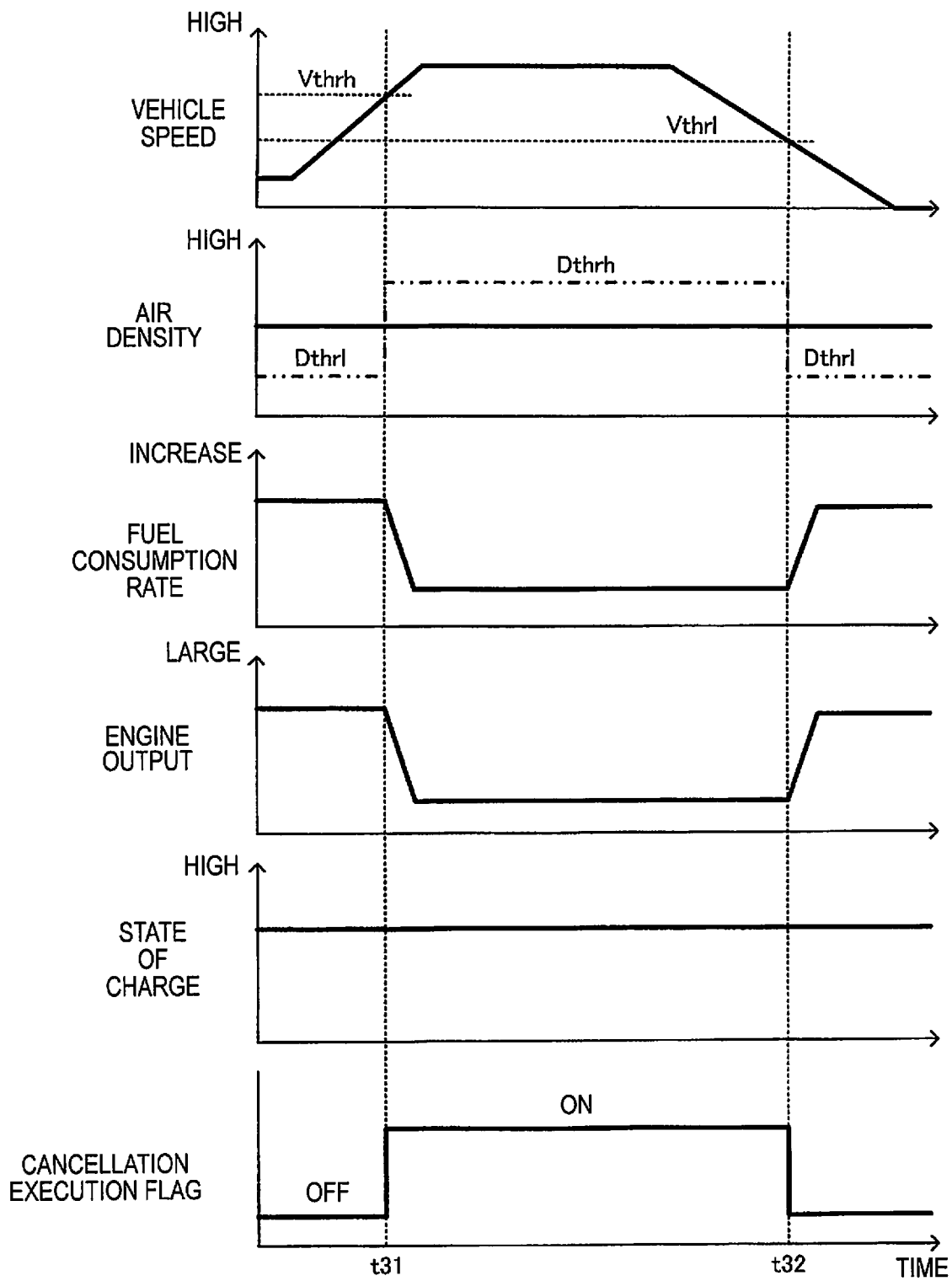
FIG. 13 is an explanatory diagram showing a cancellation determination according to an increase or decrease in vehicle speed at constant air density.
Figure 14:
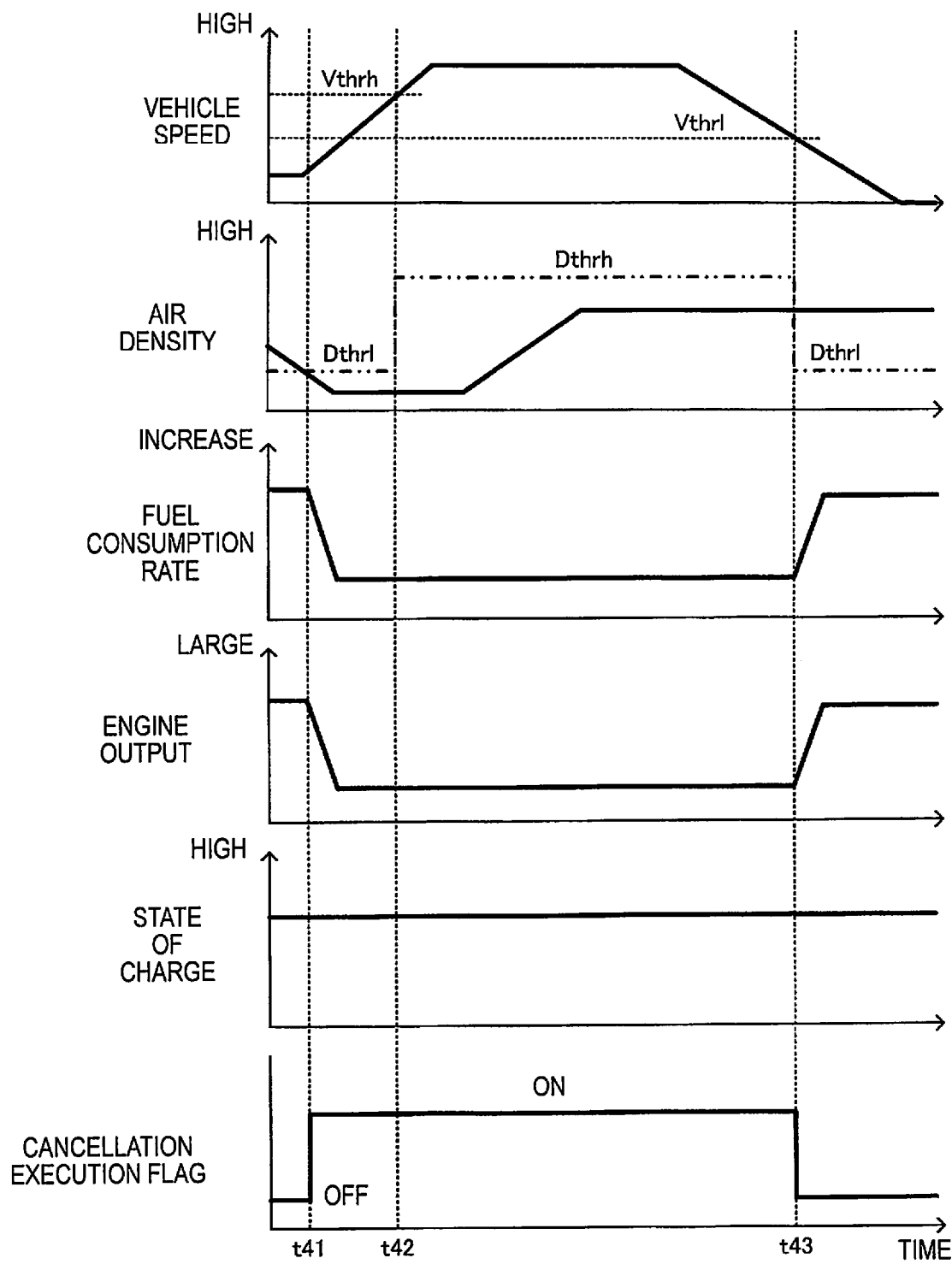
FIG. 14 is an explanatory diagram showing a cancellation determination according to an increase or decrease in vehicle speed at fluctuating air density.

FIGS. 13 and 14 show an example in which the vehicle speed VSP increases or decreases and the state of charge SOC is constant. FIG. 13 shows the case in which there is no variation in air density Dair, and FIG. 14 shows the case in which there is variation in air density Dair.

In FIG. 13, after the vehicle speed starts increasing, it is determined that the air density Dair is higher than the second predetermined density Dthrl until the vehicle speed VSP reaches the first prescribed speed Vthrh on the high speed side, and the determination is made that the air density is not in the cancellation region. When the vehicle speed VSP reaches the first prescribed vehicle speed Vthrh (time t31), it is determined that the vehicle is in the correction cancellation region since the air density Dair is less than the first prescribed density Dthrh (cancellation execution flag is on), and the correction cancellation is performed. Thereafter, until the vehicle starts to decelerate and the vehicle speed VSP reaches the second prescribed vehicle speed Vthrl on the low speed side, the air density Dair continues to be less than the first prescribed density Dthrh and the correction cancellation is continued. When the vehicle speed VSP reaches the second prescribed vehicle speed Vthrl (time t33), it is determined that the vehicle is not in the correction cancellation region since the air density Dair exceeds the second prescribed density Dthrl (cancellation execution flag off), and the execution of correction cancellation is stopped.

In FIG. 14, after the vehicle starts increasing the speed from the low vehicle speed range, the air density Dair decreases during a period from the low vehicle speed range until the vehicle speed VSP reaches the first prescribed vehicle speed Vthrh on the high vehicle speed side. When the density falls below the second prescribed density Dthrl (time t41), it is determined that the density is in the cancellation region, and the correction cancellation is performed. When the vehicle speed VSP reaches the first prescribed vehicle speed Vthrh (time t42), the determination that the vehicle is in the cancellation region is maintained due to continuance of the state in which the air density Dair is below the first prescribed density Dthrh. Thereafter, until the vehicle starts decelerating and the vehicle speed VSP reaches the second prescribed vehicle speed Vthrl on the low vehicle speed side, the state in which the air density Dair is below the first prescribed density Dthrh continues, and when the second prescribed vehicle speed Vthrl is reached (time t43), if the air density Dair exceeds the second prescribed density Dthrl, it is determined that the vehicle is not in the cancellation region (cancellation execution flag is off), and execution of the correction cancellation is stopped.

Description of Effects and Actions

The drive system S of the hybrid vehicle according to the present embodiment is configured as described above, and the effects obtained by this embodiment are described below.

First, by a correction based on the detected air density Dair (that is, the actual air density) the shortage of the actual output of the engine 1 can be solved to bring the generated power of the power generating motor 2 closer to the target generated power. Then, if the correction cancellation operation is introduced and the execution of this air density correction is permitted or stopped according to the operating state of the drive system S, the air density can be corrected for, and it is thus possible to avoid the deterioration in fuel efficiency that would have occurred and to construct a drive system S with improved overall efficiency.

Second, whether the correction should be canceled is determined by the state of charge SOC of the battery 4. When the battery 4 is in a low charge state, it is possible to secure a suitable engine output regardless of actual air density and to promote the charging of the battery 4 by performing the air density correction. On the other hand, when the battery is in a high charge state, the correction is not performed and the execution of the air density correction is stopped; it is thus possible to avoid a deterioration in the fuel efficiency due to the air density correction while securing the engine output necessary for maintaining the charge state.

Third, the possibility of correction cancellation is determined by the vehicle speed VSP, and during driving in a vehicle speed range lower than the prescribed vehicle speed Vthr, since the contribution of the engine 1 to the output formation of the drive system S is relatively low, it is possible to secure the required engine output while allowing a deterioration in fuel efficiency to the extent possible. On the other hand, during driving in a high vehicle speed range, where the engine contribution is relatively high, by stopping the execution of air density correction, it is possible to promote efficiency by reducing the fuel economy of the engine 1 while fulfilling the requirements for output formation.

Then, by application of hysteresis to the prescribed vehicle speed Vthr (Vthrh, Vthrl) at the time of the high vehicle speed determination and at the time of canceling the high vehicle speed determination, and by executing the correction cancellation based on a comparison of prescribed densities Dthrl and Dthrh and switching the frequency of stopping, it is possible to avoid complicated operation.

Here, instead of the vehicle speed VSP, the combustion state of the engine 1 is used to perform the air density correction during the intermittent combustion operation to stop the air density correction during the continuous combustion operation to ensure sufficient engine output; during intermittent combustion, the charging of battery 4 is prompted, and the frequency of stopping the engine 1 in drive mode (EV driving mode) is secured, while improving efficiency by reducing the fuel consumption of engine 1 during continuous combustion operation.

In the foregoing explanation, it is assumed that the engine 1 is operated at its best fuel consumption point, and the target engine torque and the target engine speed corresponding to the target engine output are selected from the prescribed best fuel consumption points for the engine 1. However, the setting of the target engine torque is not limited in this way, and this setting can be made in consideration of the power performance requirement for the drive system S, or requirements for sound and vibration control.

For example, when there is a power requirement (hereinafter referred to as "power performance requirement") greater than a requirement related to the charge state SOC of the battery 4 with respect to the engine torque and the engine speed (engine output), then priority is given to the formation of an output that satisfies the power performance requirement for the engine 1. As an example of a power performance requirement, there is the case in which power is supplied from the power generation motor 2 in addition to the battery 4 in order to achieve the required acceleration with respect to the depression of the accelerator pedal by the driver. In this case, it is preferable that sufficient engine output be formed by performing the air density correction without executing the correction cancellation.

Furthermore, when it is necessary to suppress vibration and noise generated from the drive system S, especially from the engine 1, the upper limit for sound and vibration control is set for the engine torque and engine speed, and the target engine torque, etc., is limited to this upper limit or less. For example, if the target engine rotational speed according to the target generated power exceeds the upper limit speed, the target engine rotational speed is updated according to the upper limit rotational speed.

Further, the correction cancellation can be realized by reducing not only the target engine torque but also the target engine output itself or lowering the target engine rotational speed.

As mentioned above, a decrease in air density occurs when the vehicle travels at high altitudes, in high-temperature areas or even in the same area when the temperature increases. Therefore, the outside air temperature, barometric pressure, and altitude of the travel region are parameters that can replace air density.

The embodiment of the present invention was described above, but the embodiment is merely an application of the present invention and only a part of the application examples thereof. The embodiment is not intended to limit the technical scope of the invention to the specific configuration of the above-described embodiment.

The invention claimed is:

1. A hybrid vehicle control method for controlling a hybrid vehicle provided with a drive system including an internal combustion engine, a generator configured to be driven by the internal combustion engine, and a battery configured to be charged by power generated by the generator, the method comprising:

setting a target generated power of the generator;

calculating a target engine output of the internal combustion engine in accordance with the target generated power;

detecting an air density in an environment in which the vehicle travels;

detecting a state of charge of the battery;

executing a correction to correct the target engine output based on the air density that was detected such that the power generated by the generator follows the target generated power even under a condition of low air density; and permitting or stopping execution of the correction in accordance with an operating state of the drive system and the state of charge of the battery such that the correction is executed upon determining the state of charge of the battery is lower than a threshold value and the correction is stopped upon determining the state of charge of the battery is higher than the threshold value and the operating state satisfies a prescribed condition, the prescribed condition being satisfied when the air density has any value smaller than a prescribed density, the prescribed density being smaller than a reference density.

2. The hybrid vehicle control method according to claim 1, wherein when there is a power performance requirement other than a requirement related to the state of charge of the battery, the hybrid vehicle control method further includes calculating another target engine output of the internal combustion engine in accordance with the power performance requirement, and setting a greater of the target engine output and the other target engine output as a final target engine output, and executing the air density correction without stopping the correction when the other target engine output is set as the target engine output.

3. The hybrid vehicle control method for controlling the hybrid vehicle of claim 1, wherein the reference density is an air density at standard atmospheric pressure.

4. The hybrid vehicle control method for controlling the hybrid vehicle of claim 1, further comprising detecting a vehicle speed; and using a first prescribed density as the prescribed density when the vehicle speed is equal to or higher than a prescribed vehicle speed and using a second prescribed density as the prescribed density when the vehicle speed is lower than the prescribed vehicle speed, the first prescribed density being smaller than the reference density and the second prescribed density being smaller than the first prescribed density.

5. The hybrid vehicle control method for controlling the hybrid vehicle of claim 4, wherein the reference density is an air density at standard atmospheric pressure.

6. The hybrid vehicle control method for controlling the hybrid vehicle of claim 1, further comprising when there is a power performance requirement to achieve a required acceleration with respect to depression of an accelerator pedal of the hybrid vehicle, calculating another target engine output of the internal combustion engine in accordance with the power performance requirement and executing the air density correction without stopping the correction.

7. A hybrid vehicle control method for controlling a hybrid vehicle provided with a drive system including an internal combustion engine, a generator configured to be driven by the internal combustion engine, a battery configured to be charged by power generated by the generator, and an electric motor that is connected to a drive wheel of the vehicle so as to transmit power thereto and configured to be simultaneously or selectively supplied with power from the generator and the battery, the method comprising:

setting a target generated power of the generator;

calculating a target engine output of the internal combustion engine in accordance with the target generated power;

detecting an air density in an environment in which the vehicle travels;

executing a correction to correct the target engine output based on the air density that was detected such that the power generated by the generator follows the target generated power even under a condition of low air density; and permitting or stopping execution of the correction in accordance with an operating state of the drive system such that the correction is executed during an intermittent operation state in which the internal combustion engine is repeatedly started and stopped and the correction is not executed during a continuous operation state in which the internal combustion engine operates continuously, the intermittent operation state being a state in which a driving mode of the hybrid vehicle changes between a hybrid driving mode and an EV driving mode.

8. The hybrid vehicle control method according to claim 7, further comprising:

detecting a vehicle speed; and determining that the intermittent operation state exists upon detecting the vehicle speed is lower than a prescribed vehicle speed and determining that the continuous operation state exists upon detecting the vehicle speed is higher than the prescribed vehicle speed.

9. The hybrid vehicle control method for controlling a hybrid vehicle according to claim 8, further comprising setting a first prescribed vehicle speed as the prescribed vehicle speed before reaching a high vehicle speed range for which the prescribed vehicle speed is a lower limit, and setting a second prescribed vehicle speed, which is lower than the first prescribed vehicle speed, as the prescribed vehicle speed after reaching the high vehicle speed range until the vehicle deviates from the high vehicle speed range.

10. A hybrid vehicle control method for controlling a hybrid vehicle provided with a drive system including an internal combustion engine, a generator configured to be driven by the internal combustion engine, a battery configured to be charged by power generated by the generator, and an electric motor that is connected to a drive wheel of the vehicle so as to transmit power thereto, and that is configured so as to be simultaneously or selectively supplied with power from the generator and the battery, the hybrid vehicle control method comprising:

setting a target generated power of the generator;

calculating a target engine output of the internal combustion engine in accordance with the target generated power;

detecting an air density in an environment in which the vehicle travels;

detecting a state of charge of the battery;

detecting a vehicle speed as an operating state of the drive system;

executing a correction to correct the target engine output based on the air density that was detected such that the power generated by the generator follows the target generated power even under a condition of low air density; and permitting or stopping execution of the correction in accordance with the operating state of the drive system and the state of charge of the battery such that the correction is executed upon determining that the state of charge of the battery is lower than a threshold value or upon determining that the state of charge is equal to or higher than the threshold value and the vehicle speed is lower than a prescribed vehicle speed, and the correction is stopped upon determining that the state of charge is equal to or higher than the threshold value and the vehicle speed is equal to or higher than the prescribed vehicle speed.

11. The hybrid vehicle control method according to claim 10, further comprising
setting a first prescribed vehicle speed as the prescribed vehicle speed before reaching a high vehicle speed range for which the prescribed vehicle speed is a lower limit, and
setting a second prescribed vehicle speed, which is lower than the first prescribed vehicle speed, as the prescribed vehicle speed after reaching the high vehicle speed range until the vehicle deviates from the high vehicle speed range.

12. A hybrid vehicle control device for a hybrid vehicle provided with a drive system including an internal combustion engine, a generator configured to be driven by the internal combustion engine, and a battery configured to be charged by power generated by the generator, comprising:
a controller that controls an output of the internal combustion,
the controller being programmed to:
calculate a target engine output of the internal combustion engine in accordance with a target generated power of the generator;
detect an air density in an environment in which the vehicle travels;
detect a state of charge of the battery;
execute a correction of the target engine output based on the air density that was detected such that the power generated power by the generator follows the target generated power even under a condition of low air density; and
permit or stop execution of the correction in accordance with an operating state of the drive system and the state of charge of the battery such that the correction is executed upon detecting the state of charge of the battery is lower than a threshold value and the correction is stopped upon detecting the state of charge of the battery is higher than the threshold value and the operating state satisfies a prescribed condition,
the prescribed condition being satisfied when the air density has any value smaller than a prescribed density, the prescribed density being smaller than a reference density.

* * * * *